(12) United States Patent
Newman et al.

(10) Patent No.: US 9,337,632 B2
(45) Date of Patent: May 10, 2016

(54) SPLICE SLEEVE RETAINER WITH THREE COUPLING MEMBERS FOR SECURING A SLEEVE TO AN ELECTRICAL JOINT BODY

(71) Applicant: Tyco Electronics Corporation, Berwyn, PA (US)

(72) Inventors: John Anthony Newman, Fuquay-Varina, NC (US); Mahmoud K. Seraj, Apex, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 14/558,032

(22) Filed: Dec. 2, 2014

(65) Prior Publication Data

US 2015/0162737 A1    Jun. 11, 2015

Related U.S. Application Data

(60) Provisional application No. 61/913,663, filed on Dec. 9, 2013.

(51) Int. Cl.
| | |
|---|---|
| *H01R 13/627* | (2006.01) |
| *H02G 1/14* | (2006.01) |
| *H02G 15/115* | (2006.01) |
| *H02G 15/013* | (2006.01) |
| *H02G 15/007* | (2006.01) |
| *H02G 15/04* | (2006.01) |

(Continued)

(52) U.S. Cl.
CPC .............. *H02G 1/14* (2013.01); *H01R 13/6275* (2013.01); *H02G 15/115* (2013.01); *H01R 4/70* (2013.01); *H01R 13/58* (2013.01); *H01R 31/06* (2013.01); *H02G 15/007* (2013.01); *H02G 15/013* (2013.01); *H02G 15/04* (2013.01); *Y10T 29/49227* (2015.01)

(58) Field of Classification Search
CPC .......... H01R 4/38; H01R 11/15; H01R 11/26; H01R 13/62; H01R 13/621; H01R 13/6275
USPC .......................................... 439/352–358, 803
See application file for complete search history.

(56) References Cited

U.S. PATENT DOCUMENTS

| | | | |
|---|---|---|---|
| 2,582,384 A | 1/1952 | Knollman | |
| 3,295,548 A * | 1/1967 | Woods .................. | A01G 25/00 239/732 |

(Continued)

OTHER PUBLICATIONS

Product Brochure, *Medium Voltage Products*, Richards Manufacturing Co., 11 pages.

*Primary Examiner* — Chandrika Prasad
(74) *Attorney, Agent, or Firm* — Myers Bigel & Sibley, P.A.

(57) ABSTRACT

A splice sleeve retainer for securing a sleeve to a leg of an electrical joint body has a retention axis and includes at least one connecting strap extending along the retention axis, and first, second and third coupling members secured to the at least one connecting strap at axially spaced apart locations along the at least one connecting strap. The splice sleeve retainer is configured such that, when the sleeve is installed on the leg and the splice sleeve retainer is installed on the sleeve: the first coupling member engages the sleeve at a first axial location; the second coupling member engages the sleeve at a second axial location nearer the leg than the first axial location; and the third coupling member engages the joint body to resist axial displacement of the sleeve relative to the leg.

21 Claims, 12 Drawing Sheets

(51) Int. Cl.
 *H01R 4/70* (2006.01)
 *H01R 13/58* (2006.01)
 *H01R 31/06* (2006.01)

(56) References Cited

U.S. PATENT DOCUMENTS

| | | | |
|---|---|---|---|
| 3,881,753 A | 5/1975 | Bochory | |
| 4,927,374 A * | 5/1990 | Batty | H01R 13/514 29/830 |
| 5,387,136 A * | 2/1995 | Britton | H01R 24/20 439/353 |
| 5,601,446 A * | 2/1997 | Wright | H01R 13/627 439/357 |
| 5,873,608 A * | 2/1999 | Tharp | F16L 55/005 285/114 |
| 6,062,917 A | 5/2000 | Kingston | |
| 6,065,782 A | 5/2000 | Allen, Jr. | |
| 6,139,068 A | 10/2000 | Burress et al. | |
| 6,364,721 B2 * | 4/2002 | Stewart, III | H01R 11/09 174/187 |
| 6,884,124 B1 | 4/2005 | Luzzi | |
| 7,249,982 B1 | 7/2007 | Craig | |
| 7,413,455 B2 | 8/2008 | Hughes et al. | |
| 7,901,243 B1 | 3/2011 | Yaworski | |
| 8,070,509 B2 * | 12/2011 | Luzzi | H01R 13/639 439/369 |
| 8,187,025 B2 | 5/2012 | Luzzi | |
| 8,221,155 B2 | 7/2012 | Luzzi | |
| D678,846 S | 3/2013 | Luzzi | |
| D683,319 S | 5/2013 | Luzzi | |
| 8,747,170 B2 | 6/2014 | Cornelius et al. | |

* cited by examiner

SPLICE SLEEVE RETAINER WITH THREE COUPLING MEMBERS FOR SECURING A SLEEVE TO AN ELECTRICAL JOINT BODY

RELATED APPLICATIONS

The present application claims the benefit of and priority from U.S. Provisional Patent Application Ser. No. 61/913,663 filed Dec. 9, 2013, the disclosure of which is incorporated herein by reference.

FIELD OF THE INVENTION

The present invention relates to electrical connections and, more particularly, to splice sleeve retainers for electrical connections.

BACKGROUND

Disconnectable joint busbars are commonly used in electrical power transmission networks in urban environments. The busbar includes a body with two or more connection features (e.g., thread bores in or posts or lugs extending from the body) and an electrical insulation layer covering the body. Electrical power cables to be spliced are provided with a cable termination lug or connector. Each cable termination lug is disconnectably and reconnectably secured to a respective busbar lug by a bolt or the like, for example.

Disconnectable joint assemblies as described above are useful in urban network applications where a utility may need the ability to disconnect a joint to sectionalize a piece of cable for repair, for example. By way of example, a bad or damaged cable may be disconnected from the busbar to remove the cable from the circuit in a quick and efficient manner, and then reconnected to the busbar after the repair is made.

In order to protect the joint, cable, busbar and cable terminal lug from the environment (e.g., moisture) and to protect technicians from the electrically energized components, joint sleeves are employed. Typically, the joint sleeve is a resilient, relatively stiff push-on sleeve formed of EPDM rubber. A splice sleeve retainer may be provided to prevent or inhibit the joint sleeve from sliding off from the busbar.

Power distribution connections as discussed above are typically housed in an above-ground cabinet or a below-grade vault, manhole or box. As a result, the space available for positioning and handling the busbar connection may be confined and the connection may be subjected to environmental moisture and other contaminants.

SUMMARY OF THE INVENTION

According to embodiments of the present invention, a splice sleeve retainer for securing a sleeve to a leg of an electrical joint body has a retention axis and includes at least one connecting strap extending along the retention axis, and first, second and third coupling members secured to the at least one connecting strap at axially spaced apart locations along the at least one connecting strap. The splice sleeve retainer is configured such that, when the sleeve is installed on the leg and the splice sleeve retainer is installed on the sleeve: the first coupling member engages the sleeve at a first axial location; the second coupling member engages the sleeve at a second axial location nearer the leg than the first axial location; and the third coupling member engages the joint body to resist axial displacement of the sleeve relative to the leg.

According to embodiments of the present invention, an environmentally protected joint assembly includes an electrical joint body including a leg, an electrically insulating sleeve mounted on the leg, and a splice sleeve retainer. The splice sleeve retainer includes at least one connecting strap extending along a retention axis, and first and second coupling members secured to the at least one connecting strap at axially spaced apart locations along the at least one connecting strap. The splice sleeve retainer is mounted on the sleeve and the joint body such that: the first coupling member engages the sleeve at a first axial location; and the second coupling member engages the sleeve at a second axial location nearer the leg than the first axial location.

According to method embodiments of the present invention, a method for forming an environmentally protected joint assembly includes mounting an electrically insulating sleeve on a leg of an electrical joint body, and providing a splice sleeve retainer including: at least one connecting strap extending along a retention axis; and first and second coupling members secured to the at least one connecting strap at axially spaced apart locations along the at least one connecting strap. The method further includes mounting the splice sleeve retainer on the sleeve and the joint body such that: the first coupling member engages the sleeve at a first axial location; and the second coupling member engages the sleeve at a second axial location nearer the leg than the first axial location.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

Figure 1:
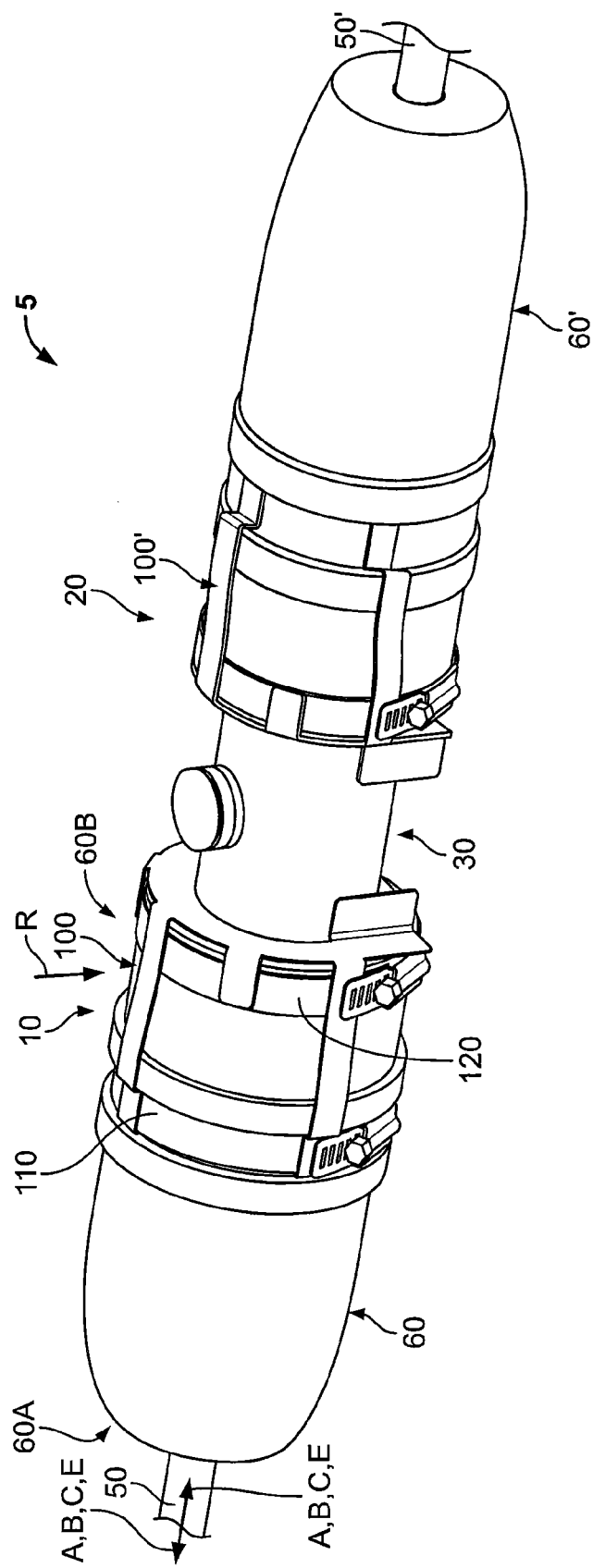
FIG. 1 is a perspective view of a disconnectable joint assembly according to embodiments of the present invention.
Figure 2:
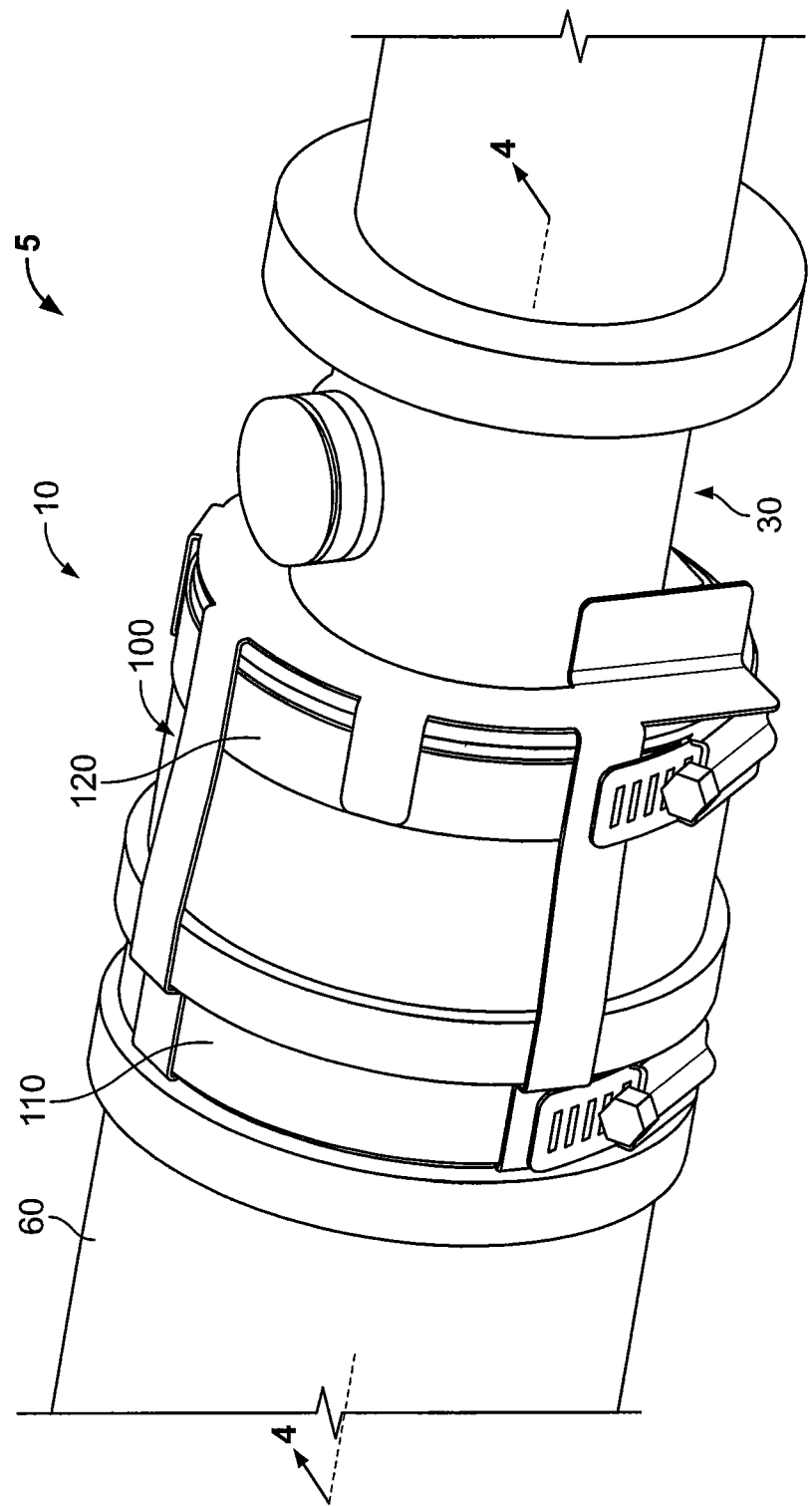
FIG. 2 is an enlarged, fragmentary, perspective view of the joint assembly of FIG. 1.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "monolithic" means an object that is a single, unitary piece formed or composed of a material without joints or seams.

As used herein, "cold-applied" or "cold-applied cover" means that the cover or component can be assembled or installed about a substrate (e.g., a cable) without requiring the use of applied heat at the time of installation.

With reference to FIGS. 1-5, a disconnectable joint assembly 5 according to some embodiments of the present invention is shown therein. The joint assembly 5 includes an electrical joint body or busbar 30, an electrical power distribution cable 50 coupled to the busbar 30 by a cable termination connector 46 (FIG. 3) at a first protected disconnectable joint 10, and an electrical distribution power cable 50' coupled to the busbar 30 (by a cable connector, not shown) at a second, opposing protected disconnectable joint 20. The joint assembly 5 further includes cable receptacle housings or environmental protection cover sleeves 60, 60' and pair of splice sleeve retainers 100, 100' (FIGS. 6-10). As discussed in more detail herein, the sleeve 60 environmentally protects the joint 10 and is secured thereto by the splice sleeve retainer 100. Similarly, the sleeve 60' environmentally protects the joint 20 and is secured thereto by the splice sleeve retainer 100'. The splice sleeve retainers serve to maintain sealing and mechanical stability of the sleeves 60, 60' on the busbar 30.

The joints 10, 20, sleeves 60, 60' and splice sleeve retainers 100, 100' may be constructed in the same or substantially the same manner. Therefore, only the components and assembly of the joint 10 will be described hereinbelow in detail, it being understood that this description can likewise apply to the joint 20.

The exemplary busbar 30 may be referred to as an in-line busbar for forming an I-joint; however, embodiments of the invention can be employed with busbars and joints of other configurations and types. The busbar 30 includes a hub portion 32 and opposed bushings or legs 34, 34' extending from the hub portion 32. The busbar 30 includes a busbar conductor 36 (FIG. 4), a generally tubular electrical insulation layer 38 surround the busbar conductor 36, a generally tubular housing 41 surrounding the insulation layer 38, and an electrically conductive (e.g., copper or aluminum) test cap 42.

Figure 3:
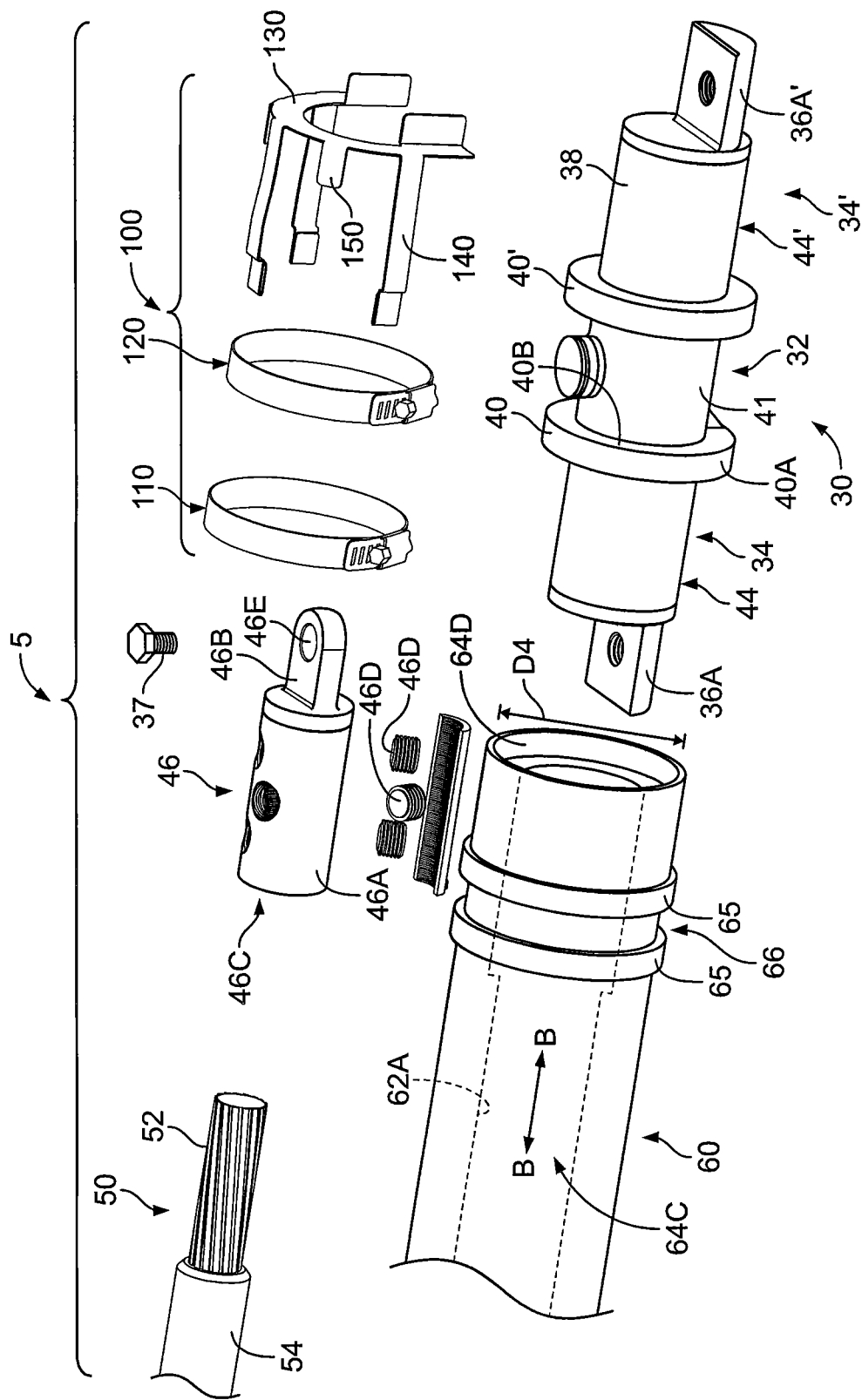
FIG. 3 is an exploded, perspective view of the joint assembly of FIG. 1.
Figure 4:
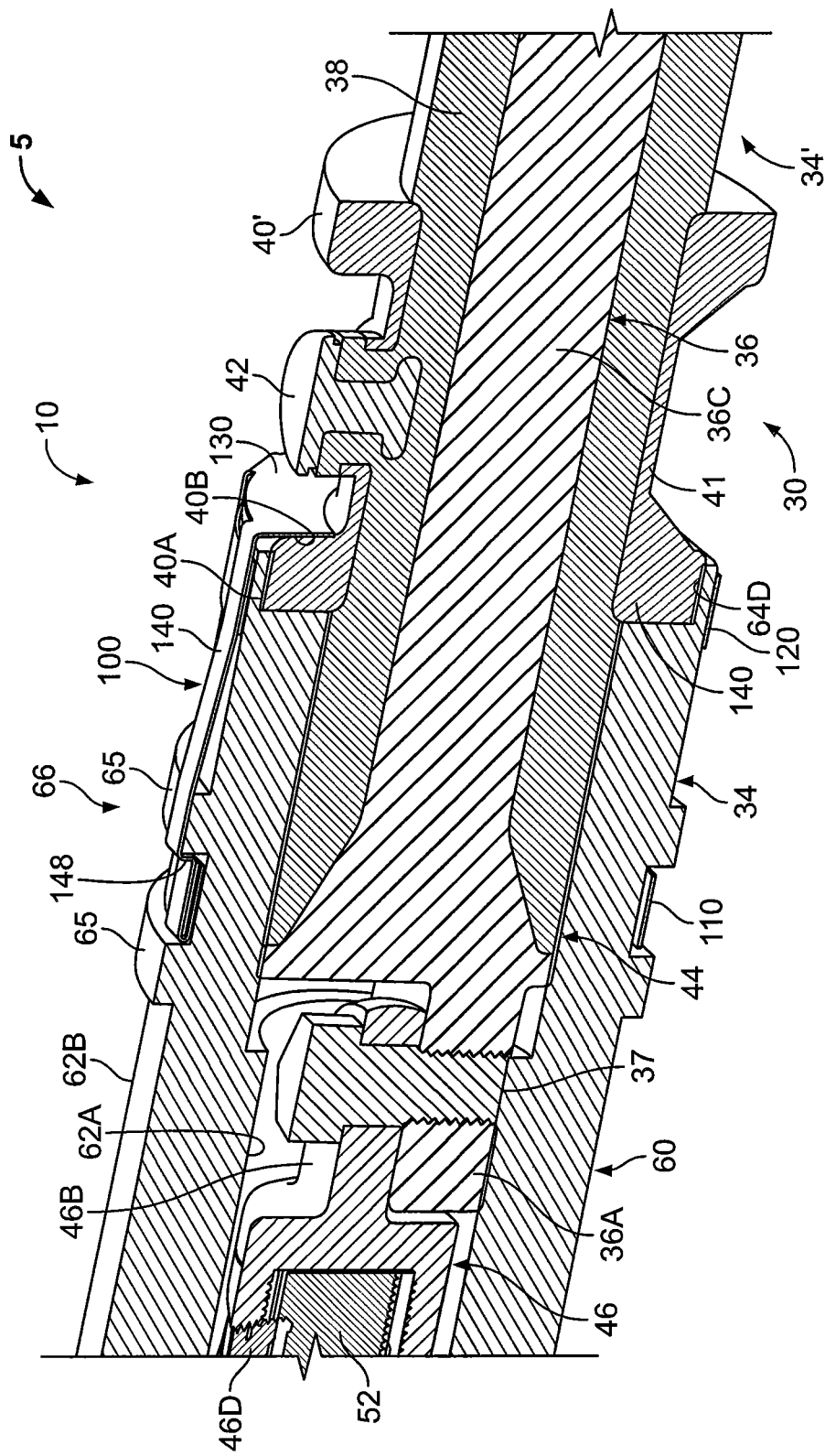
FIG. 4 is an enlarged, fragmentary, cross-sectional perspective view of the joint assembly of FIG. 1 taken along the line 4-4 of FIG. 2.
Figure 5:
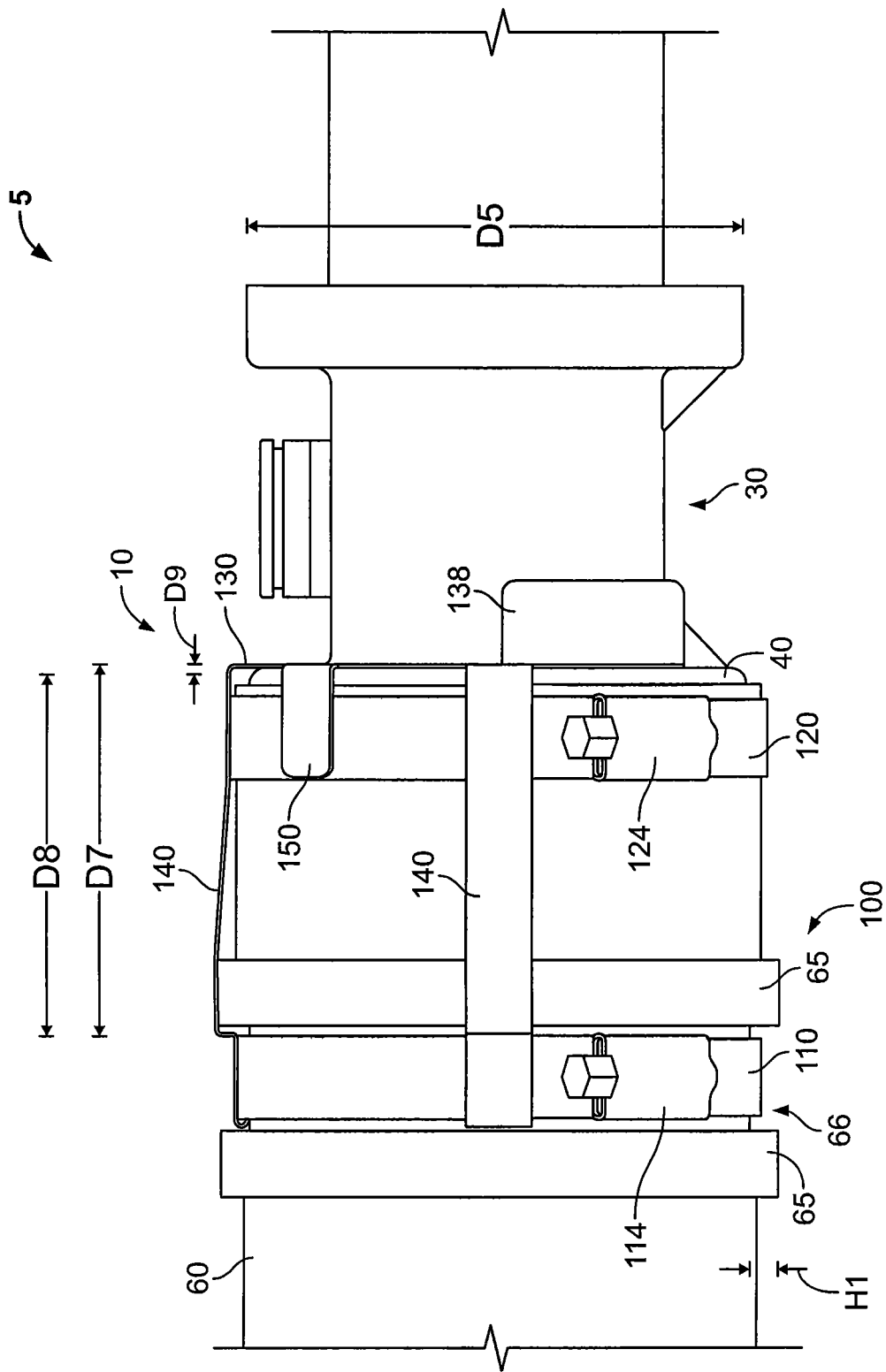
FIG. 5 is an enlarged, fragmentary, side view of the joint assembly of FIG. 1.
Figure 6:
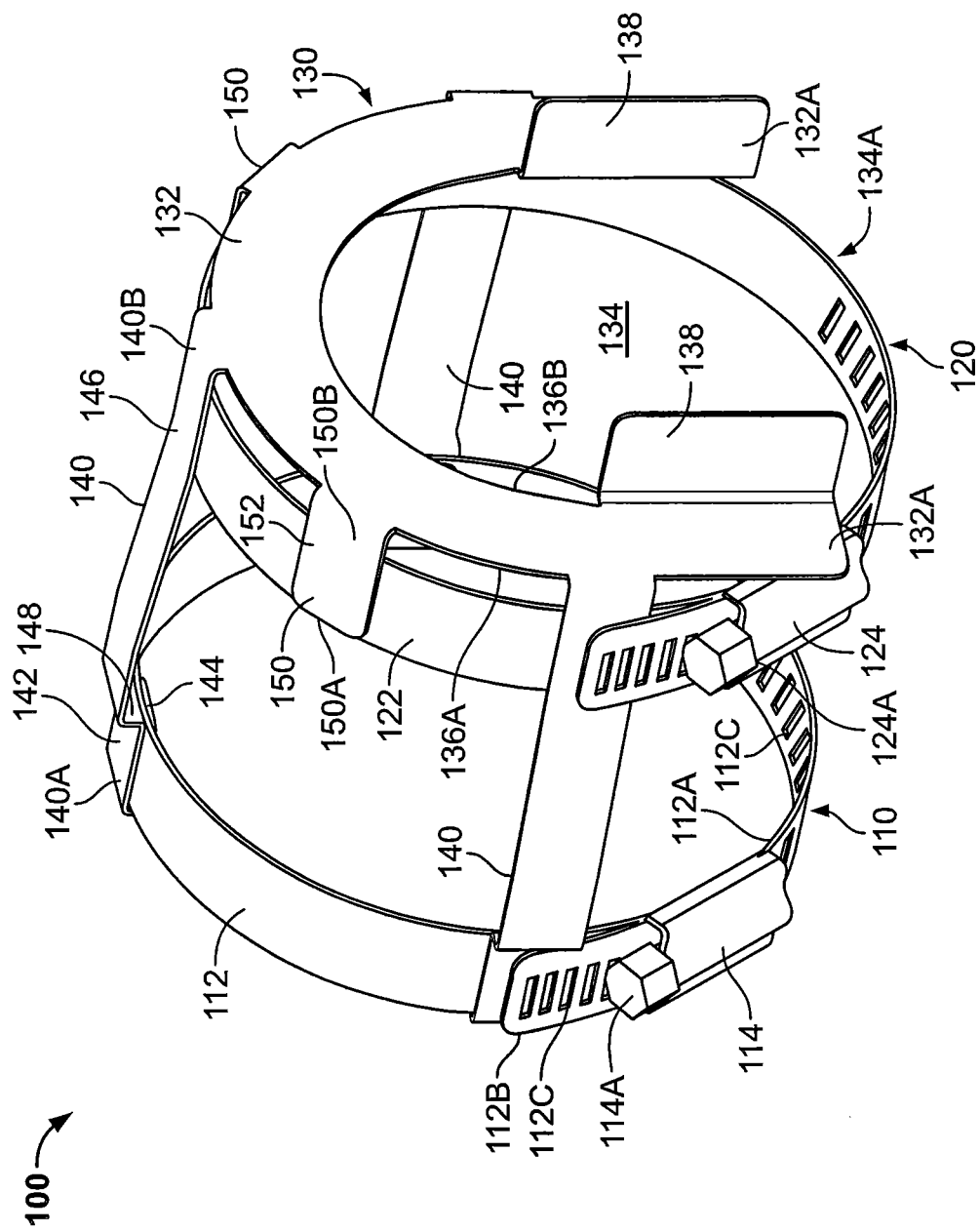
FIG. 6 is a front perspective view of a splice sleeve retainer forming a part of the joint assembly of FIG. 1 according to embodiments of the invention.
Figure 7:
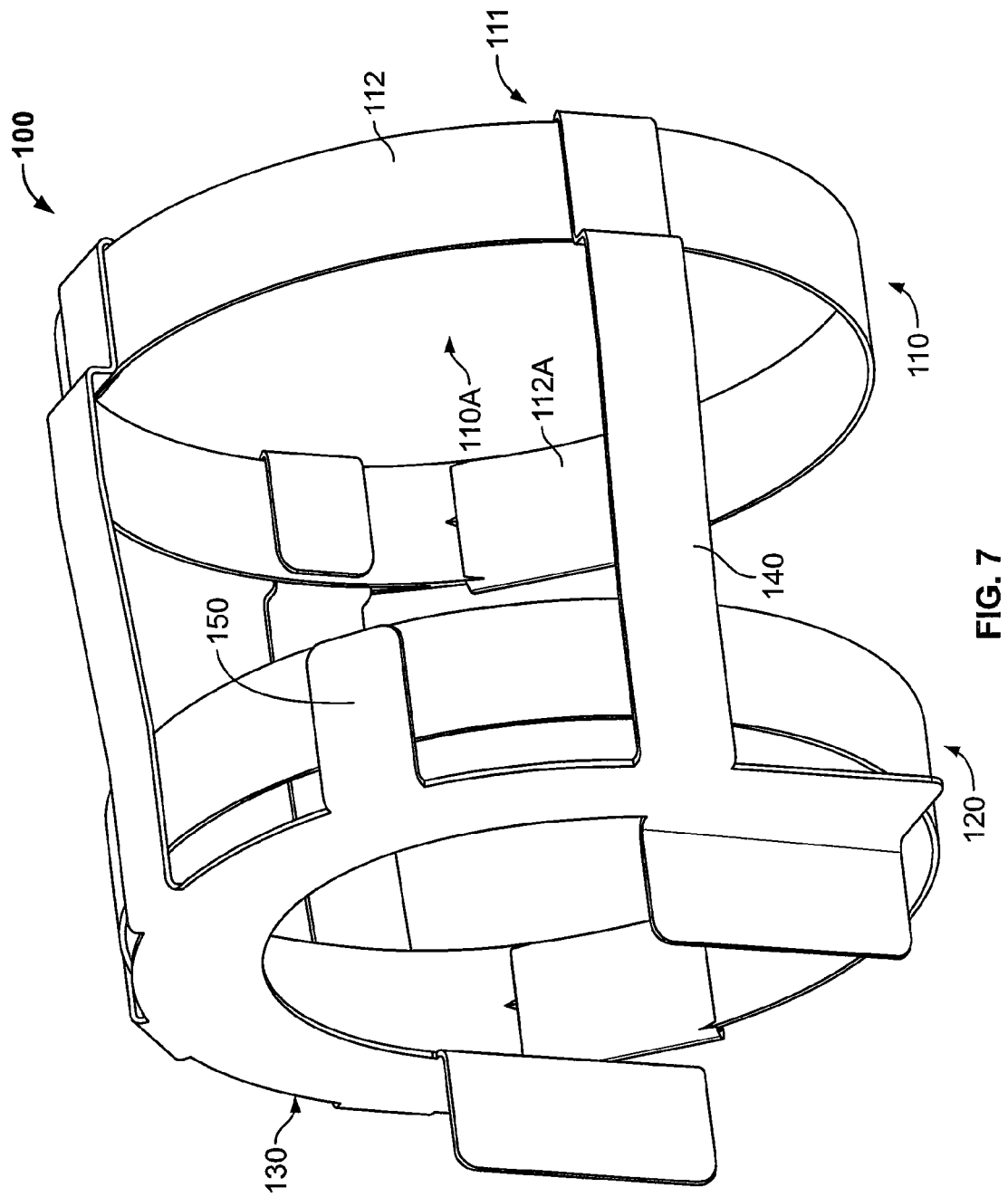
FIG. 7 is an opposing front perspective view of the splice sleeve retainer of FIG. 6.
Figure 8:
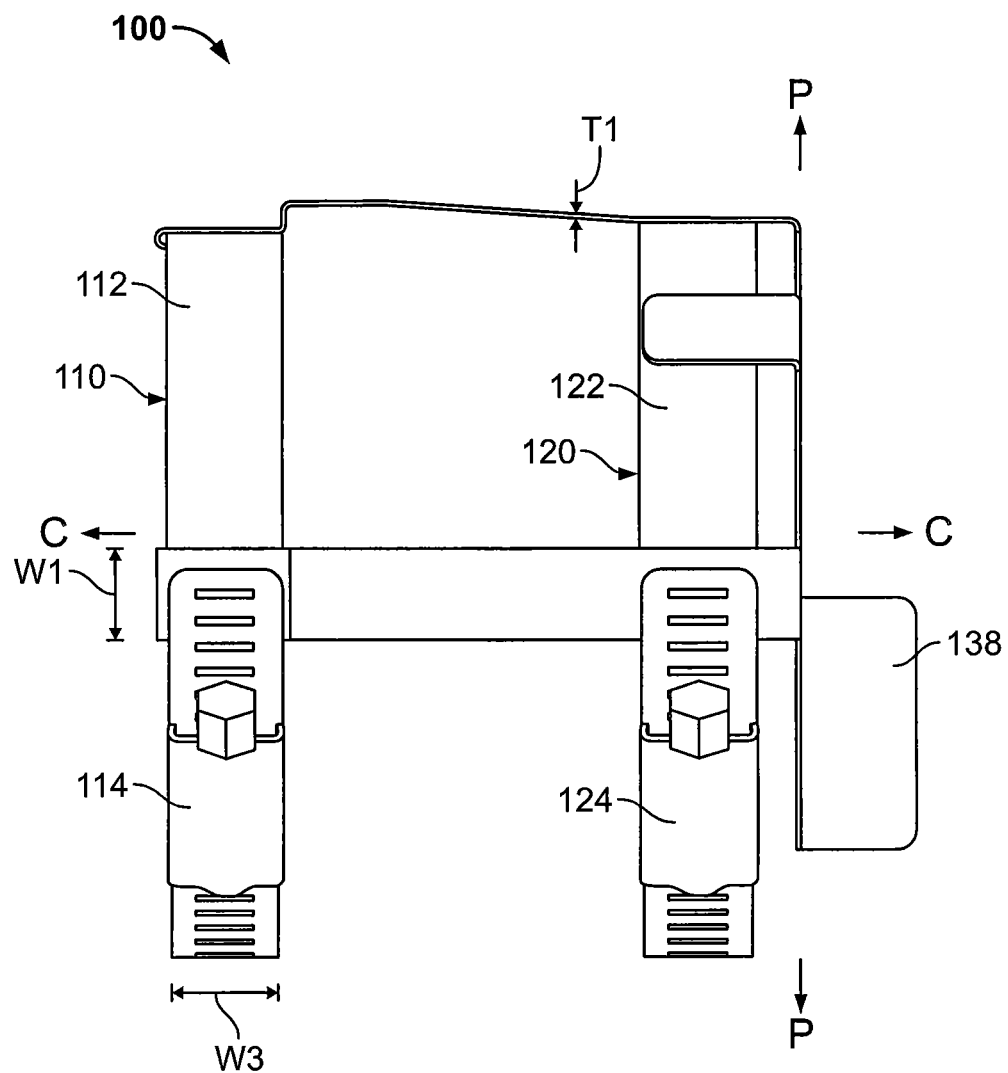
FIG. 8 is a side view of the splice sleeve retainer of FIG. 6.

With reference to FIGS. 3 and 4, the busbar conductor 36 includes a connection portion 36C and opposed connector lugs 36A, 36A' extending from the connecting portion 36C and axially beyond the ends of the insulation layer 38. A thread bore 36D is defined in each lug 36A, 36A'. A distal leg portion 44, 44' of each leg 34, 34' extends axially beyond each end of the housing 41. The housing 41 includes an integral, annular, upstanding lip or flange 40, 40' on each end thereof adjacent the respective distal leg portion 44, 44'. Each flange 40, 40' has an annular outer face 40A and an annular back face 40B. Each leg 34, 34' has a joint axis A-A.

The busbar conductor 36 may be integrally formed (e.g., cast or machined) of a suitable metal such as copper or aluminum. The insulation layer 38 may be formed of a suitable electrically insulating elastomer such as EPDM, and may be overmolded on the busbar conductor 36. The housing 41 may be formed of any suitable, sufficiently rigid material, such as steel or aluminum.

As shown in FIG. 3, the cable 50 includes a primary electrical conductor 52 and an electrically insulating or dielectric jacket or insulation layer 54 surrounding the conductor 52. The primary conductor 52 may be formed of any suitable electrically conductive materials such as copper (solid or stranded). The insulation layer 54 may be formed of any suitable material such as EPDM.

The cable connector 46 includes a coupling portion 46A and a lug 46B. A terminal end portion of the conductor 52 extends beyond the insulation 54 and is secured in a bore 46C of the coupling portion 46A by threaded fasteners 46D (e.g., bolts). Alternatively, the coupling portion 46A may be a compression fitting compressed onto the conductor 52. A fastening bore 46E is provided in the lug 46B. As discussed below, a fastener (e.g., bolt) 37 can be used in cooperation with the bores 36D, 46E to secure the cable connector 46 to the lug 36A. The cable connector 46 may be formed of any suitable electrically conductive material, such as copper or aluminum.

The sleeve 60 is tubular and has opposed inner and outer surfaces 62A and 62B (FIGS. 3 and 4) and opposed ends 60A, 6013. The sleeve 60 defines an axially extending conductor through passage 64C that communicates with opposed end openings 64A, 64B and defines a sleeve axis B-B. An annular inner groove 64D is located at the front opening 64B. Upstanding, annular, circumferentially extending ribs 65 surround and project radially outwardly from the outer surface 62B. The ribs 65 are spaced apart to define therebetween, along with the outer surface 62B, an annular, circumferentially extending anchoring groove 66 surrounding the sleeve 60.

The sleeve 60 can be formed of any suitable material. According to some embodiments, the sleeve 60 is formed of an electrically insulative material. According to some embodiments, the sleeve 60 is formed of an elastically expandable material. According to some embodiments, the sleeve 60 is formed of an elastomeric material. According to some embodiments, the sleeve 60 is formed of ethylene propylene diene monomer (EPDM) rubber. Other suitable materials may include neoprene or other rubber. According to some embodiments, the sleeve 60 has a Modulus at 100 percent elongation (M100) in the range of from about 0.6 to 1.5 MPa.

According to some embodiments, the thickness of the sleeve 60 is in the range of from about ⅓ to ⅝ inch. According to some embodiments, the length of the sleeve 60 is in the range of from about 10 to 20 inches. According to some embodiments, the depth H1 (FIG. 5) of the groove 66 is in the range of from about 0.2 to 0.3 inch.

With reference to FIGS. 6-10, the splice sleeve retainer 100 has a retention axis C-C and includes a first coupling member or rear circumferential clamp 110, a second coupling member or front circumferential clamp 120, a third coupling member, brace portion or brace 130, a plurality of long connecting straps 140, and plurality of short connecting straps 150. The clamps 110, 120 and the brace 130 are secured to the straps 140, 150 at spaced apart locations along the axis C-C. The straps 140, 150 extend generally parallel to the axis C-C. The long connecting straps 140 extend longitudinally at the 12 o'clock, 3 o'clock and 9 o'clock positions, and the short connecting straps 150 are positioned between the straps 140.

Figure 9:
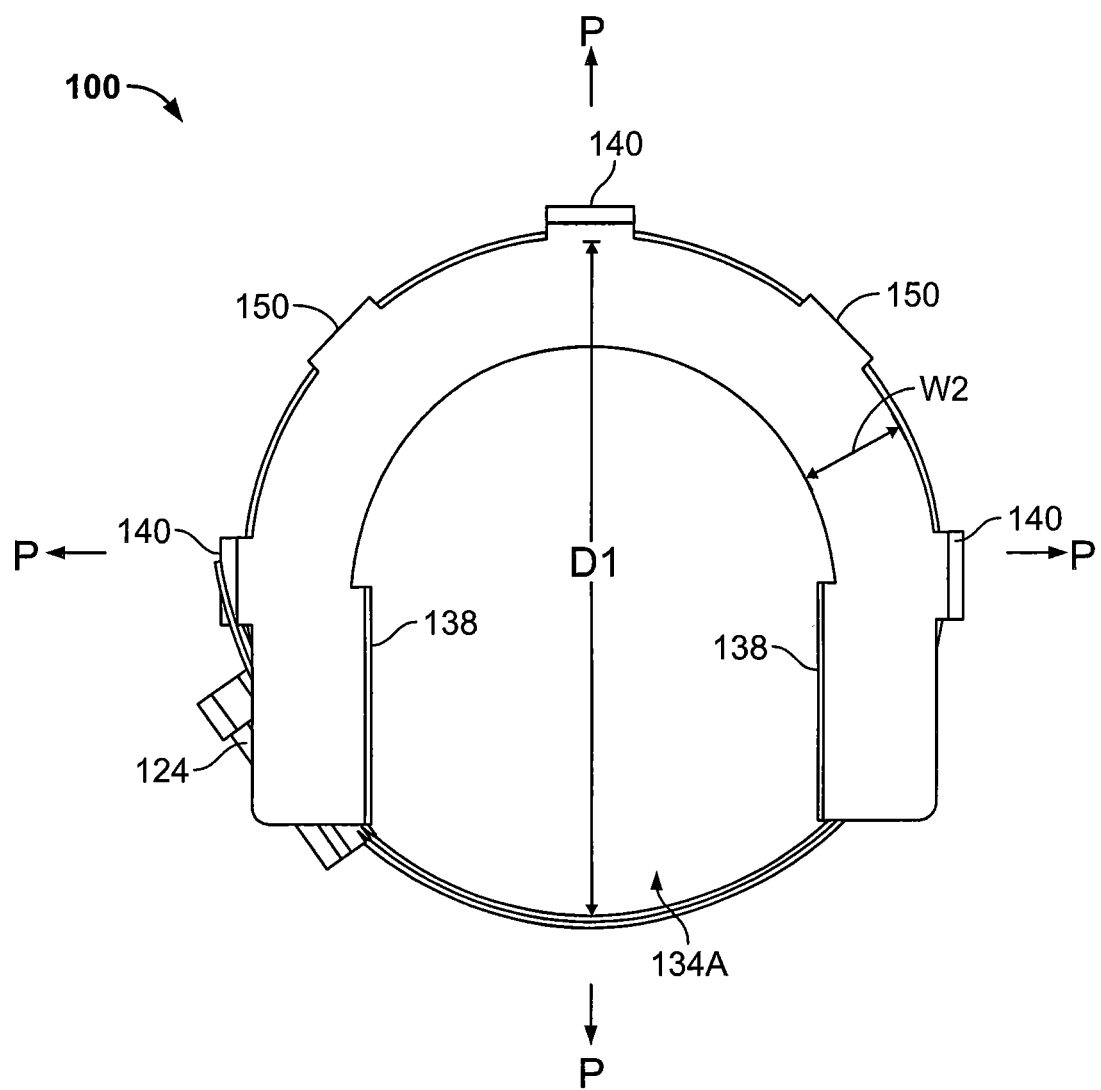
FIG. 9 is a front view of the splice sleeve retainer of FIG. 6.
Figure 10:
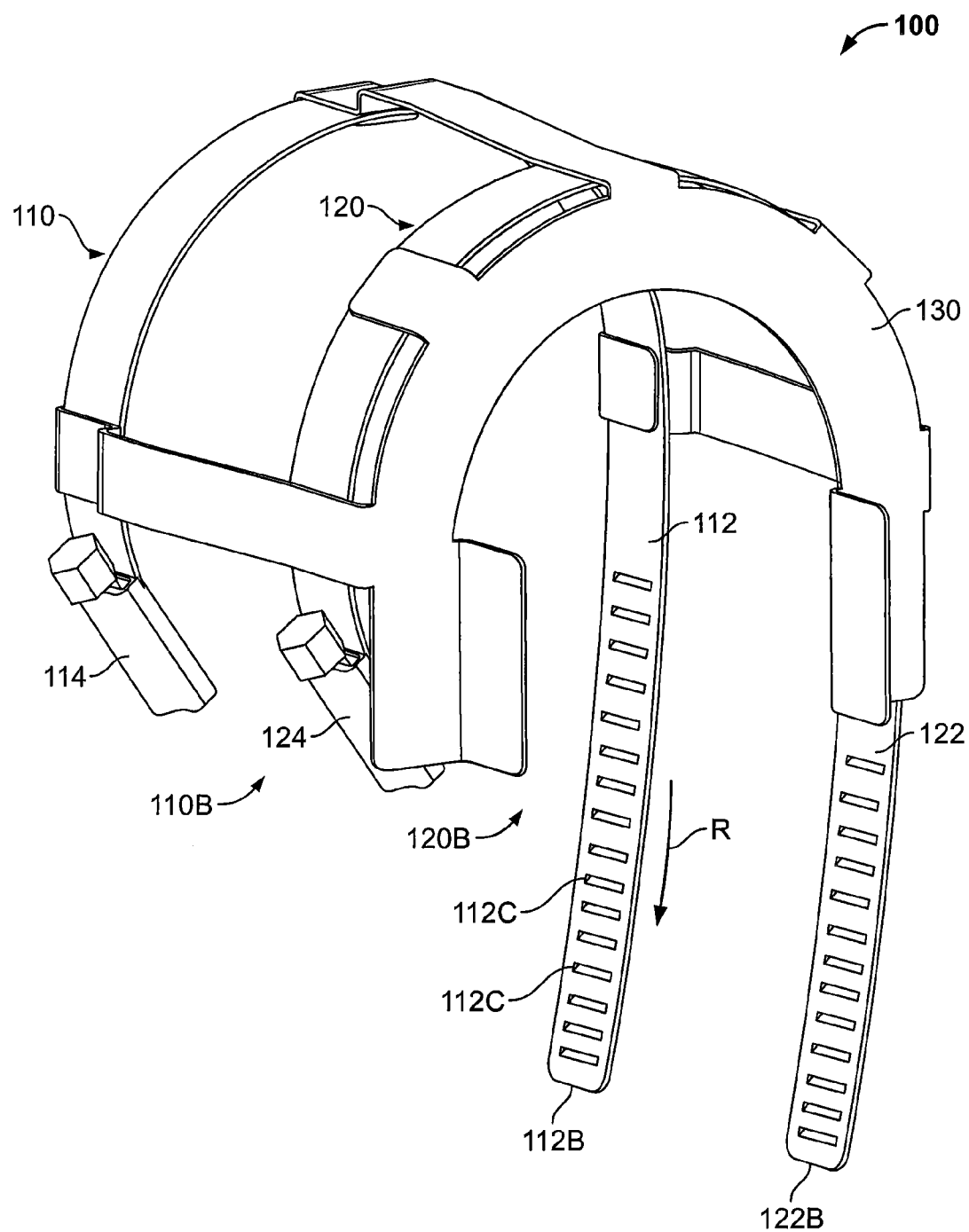
FIG. 10 is a front perspective view of the splice sleeve retainer of FIG. 6 wherein clamps thereof are in an open position.

The rear circumferential clamp 110 is configurable to form an endless circumferential band having an adjustable inner diameter D1 (FIG. 9). According to some embodiments and as illustrated, the clamp 110 is a hose clamp including a flexible band 112 (having opposed ends 112A, 112B), drive slots 112C defined in the band 112, and an adjustment mechanism (e.g., a screw actuated or worm gear mechanism) 114. The end 112B of the band 112 can be initially non-engaged or disengaged from the adjustment mechanism 114 so that the clamp 110 defines a sideward, radial or lateral opening 110B (FIG. 10) (i.e., open looped). The end 112B can then be inserted into or pre-installed in the adjustment mechanism 114 to form an endless band or closed loop 111. The closed loop 111 defines a through passage 110A. The adjustment mechanism 114 has a drive head 114A that can be rotated to adjust the length of loop formed by the band 112, and thereby the inner diameter D1 of the clamp 110.

The clamp 110 may be formed of any suitable material(s). In some embodiments, the band 112 is formed of metal and, in some embodiments, steel.

The front circumferential clamp 120 includes a band 122 and an adjustment mechanism 124 and may be constructed and operated in the same manner as described for the clamp 110.

In some embodiments, other circumferential clamping devices may be used in place of the circumferential clamps 110, 120. Other suitable circumferential clamping devices may include spring hose clamps, rope, strap clamps, snap hose clamps, cable ties, zip ties or tie wraps.

The brace 130 includes a generally horseshoe or U-shaped plate or body 132 terminating at ends 132A. The body 132 extends along a brace plane P-P transverse to (and, in some embodiments, orthogonal to) the retention axis C-C. The body 132 defines a central opening 134 and a laterally opening side slot 134A communicating with the opening 134. The brace 130 has an outer circumferential edge 136A and an inner circumferential edge 136B. Opposed reinforcement features 138 project axially forwardly from the body 132 along the inner edge 136B adjacent the ends 132A. The reinforcement features 138 as shown are flat elongate tabs; however, other configurations may be used or the reinforcement features can be omitted.

Each of the long connecting straps 140 has opposed ends 140A, 140B. The rear end 140A of each strap 140 is secured to the rear clamp 110 by a front attachment 142. The rear end 140A of each strap 140 is also coupled to the rear clamp 110 by a folded portion 144 that loops around the rear edge of the clamp 110. The front end 140B of each strap 140 is connected to the outer edge 136A of the brace 130. In some embodiments and as shown, each strap 140 is integrally formed with the edge 136A. Each strap 140 is also secured to the front clamp 120 by a front attachment 146 adjacent the front end 140B. A kink or step 148 is provided in each strap 140 proximate the front edge of the clamp 110. According to some embodiments, the attachments 142, 146 are welds (e.g., tack welds); however, other attachment techniques may be used such as adhesive.

Each of the short connecting straps 150 has opposed ends 150A, 150B. The rear end 150A of each strap 150 is secured to the front clamp 120 by a front attachment 152. The rear end 150A of each strap 150 may also be coupled to the front clamp 120 by a folded portion (not shown) that loops around the rear edge of the clamp 120. The front end 150B of each strap 150 is connected to the outer edge 136A of the brace 130. In some embodiments and as shown, each strap 150 is integrally formed with the edge 136A. According to some embodiments, the attachments 152 are welds (e.g., tack welds); however, other attachment techniques may be used such as adhesive.

Thus, it will be appreciated that the clamps 110, 120, the brace 130, and the straps 140, 150 form a unitary or integral structure. The components 110, 120, 130, 140, 150 may be formed of any suitable material(s). According to some embodiments, at least the straps 140, 150 are formed of a material that is bendable but exhibits little or no significant stretch in service. In some embodiments, the components 110, 120, 130, 140, 150 are formed of metal and, in some embodiments, steel. In some embodiments, one or more of the components 110, 120, 130, 140, 150 is formed of a nonmetal such as a polymeric material. The splice sleeve retainer 100 may be formed by any suitable technique. In some embodiments, the brace 130 and straps 140, 150 are unitarily cold formed or stamped as a solid monolithic piece from a sheet of flat stock metal and welded to and bent about the clamps 110, 120. This construction method may provide enhanced strength. In other embodiments, the brace 130 and the straps 110, 120 are formed separately and welded to one another (and to the clamps 110, 120). This construction method may reduce waste in the manufacturing process.

According to some embodiments, the components 110, 120, 130, 140, 150 each have a thickness T1 (FIG. 8) in the range of from about 0.015 to 0.045 inch. According to some embodiments, the straps 140, 150 each have a width W1 (FIG. 8) in the range of from about 0.25 to 0.75 inch. According to some embodiments, the brace 130 has a width W2 (FIG. 9) in the range of from about 0.5 to 1 inch. According to some embodiments, the clamps 110, 120 each have a width W3 (FIG. 8) in the range of from about ⅜ to ¾ inch. According to some embodiments, the distance D9 (FIG. 5) between the front clamp 120 and the brace 130 is in the range of from about 0.1 to 0.3 inch.

The splice sleeve retainer 100 and the sleeve 60 may be installed as follows in accordance with methods of the present invention to form the protected disconnectable joint 10. The splice sleeve retainer 100 and the sleeve 60 may be provided in combination as a kit. The splice sleeve retainer 100 and the sleeve 60 may be installed on the busbar 30 as a retrofit, replacing an existing cover. The splice sleeve retainer 100 may be installed as a retrofit on an existing cover sleeve mounted on the busbar 30. The sleeve 60 and the splice sleeve retainer 100 can be cold-applied, providing a cold-applied cover for the connection.

The sleeve 60 is parked on the cable 50. The cable connector 46 is secured to the cable conductor 52. The cable conductor 46 is then secured to the lug 36A by the bolt 37.

The sleeve 60 is then slid axially and pushed onto the flange 40 as shown in FIG. 4 so that the end 60B of the sleeve 60 is proximate the back face 40B of the flange 40 and the flange 40 is received in the sleeve groove 64D. According to some embodiments, the relaxed inner diameter D4 (FIG. 3) of the sleeve 60 is less than the outer diameter D5 (FIG. 5) of the flange outer face 40A so that the sleeve 60 exerts a persistent radially inwardly compressive or clamping force or pressure (due to elastic tension) onto the flange 40.

In some embodiments, the splice sleeve retainer 100 is initially configured such that the ends 112B, 122B (FIG. 10) of the bands 112, 122 of the clamps 110, 120 are disengaged from the adjustment mechanisms and the clamps 110, 120 thereby define laterally open slots 110B, 120B facing in the same radial direction R (transverse to the splice sleeve retainer axis C-C) as the brace side slot 134A. The splice sleeve retainer 100 is slid laterally down onto the sleeve 60 and leg 36 so that the rear clamp 110 is received in the groove 66, the brace 130 is seated immediately forward of the flange 40 (abutting or facing the back face 40B), and the front clamp 120 surrounds the portion 67 of the sleeve circumferentially surrounding the flange 40.

The ends of the bands 112, 122 are then threaded into the adjustment mechanisms 114, 124 to close the clamp loops. The clamps 110, 120 are then tightened about the sleeve 60 using the drive heads 114A, 124A. The front clamp 120 is tightened sufficiently to elastically deform the sleeve 60 and apply a persistent radially compressive load to the sleeve 60 and the underlying flange 40. The rear clamp 110 is tightened sufficiently to retain the seating of the clamp 110 in the groove 66. In some embodiments, the rear clamp 110 is tightened sufficiently to elastically deform the sleeve 60 and apply a persistent radially compressive load to the sleeve 60 and the underlying distal leg portion 44. In some embodiments, the straps 140 remain in tension between the clamps 110, 120 and, in some embodiments, between the brace 130 and the clamp 120. In some embodiments, the straps 150 remain in tension between the brace 130 and the clamp 120.

Installation of the splice sleeve retainer 100 is facilitated by the configuration thereof. This may of particular value when the splice sleeve retainer 100 is installed in a manhole or other confined location. As used herein, the "top" of the splice sleeve retainer 100 refers to the edge opposite the side opening 134A (i.e., the edge extending along the connecting strap 140 at the middle or 12 o'clock position).

When the clamps 110, 120 are open, their lateral side openings 110B, 120B face down in the same direction R (FIG. 1) as and in longitudinal alignment with the side opening 134A. The open splice sleeve retainer 100 can therefore be slid laterally down (i.e., with respect to and transverse to the cable axis E-E, the sleeve axis B-B and the splice sleeve retainer axis C-C) onto the sleeve 60 and the leg 34, generally in a single convenient motion.

Notably, the adjustment drive heads 114A, 124A of the clamps 110, 120 are located on the bottom half of the splice sleeve retainer 100 and face generally upwardly. As a result, when the clamps 110, 120 are open, the drive heads 114A, 124A are conveniently positioned (both in location and orientation) for access and operation from above by a driver. The driver can be inserted substantially vertically from the top of the splice sleeve retainer 100.

In use, the reinforcement features serve to stiffen the brace 130 against undesirable deflection or flexure, particularly proximate the free ends 132A.

The splice sleeve retainer 100 prevents or inhibits the sleeve 60 from backing off the busbar 30 once installed. The splice sleeve retainer 100 can be used with any busbar configuration, regardless of whether there is another sleeve opposite the sleeve 60 retained by the splice sleeve retainer 100. For example, because the splice sleeve retainer only engages the flange 40 of the leg on which the sleeve 60 is mounted, it is not necessary to anchor the splice sleeve retainer 100 to an opposing sleeve or busbar leg. The sleeve 60 can therefore be installed and removed independently of the other joint connections. The U-shaped brace 130 allows the splice sleeve retainer 130 to be installed on H-, I-, Y- and U-shaped joints without interfering with ribs, connections or other joint components. Thus, it is not necessary to carry multiple splice sleeve retainer devices configured to fit different joint configurations.

The sleeve 60, under the compressive load of the clamp 120, forms a tight seal (in some embodiments, a liquid tight seal) at the interface between the sleeve inner surface 62A and the flange outer face 40A. This seal can protect the joint from the ingress of environmental moisture and debris. While some press on sleeves are vulnerable to leakage when the attached cable is bent and the sleeve is dislodged from the busbar, the splice sleeve retainer 100 and sleeve 60 can prevent such leakage by firmly grasping the sleeve 60 about the leg 34 and bracing with the brace 130. Because the splice sleeve retainer 100 is attached to the flange 140 of the leg 34 on which the sleeve 60 is mounted as well as around the opening of the same sleeve 60, greater sealing is provided at the interface between the sleeve opening 60B and the busbar 30 by reducing the moment arm of the splice sleeve retainer 100 should any bending occur. The placement of the circumferential clamp 120 near the sleeve opening 60B shortens the distance contaminants may ingress before encountering a compressed seal.

The splice sleeve retainer 100 and the configuration of the joint 20 maintain user access to the test point 42 of the busbar 30.

According to some embodiments, the distance D7 (FIG. 5) from the brace 130 to the rear clamp 110 is selected to ensure the proper or desired positioning of the sleeve 60 on the busbar 30 when the sleeve 60 and splice sleeve retainer 100 are installed. In particular, in some embodiments, the distance D7 is substantially the same as the distance D8 from the back face 40B of the flange 40 to the groove 66.

Figure 11:
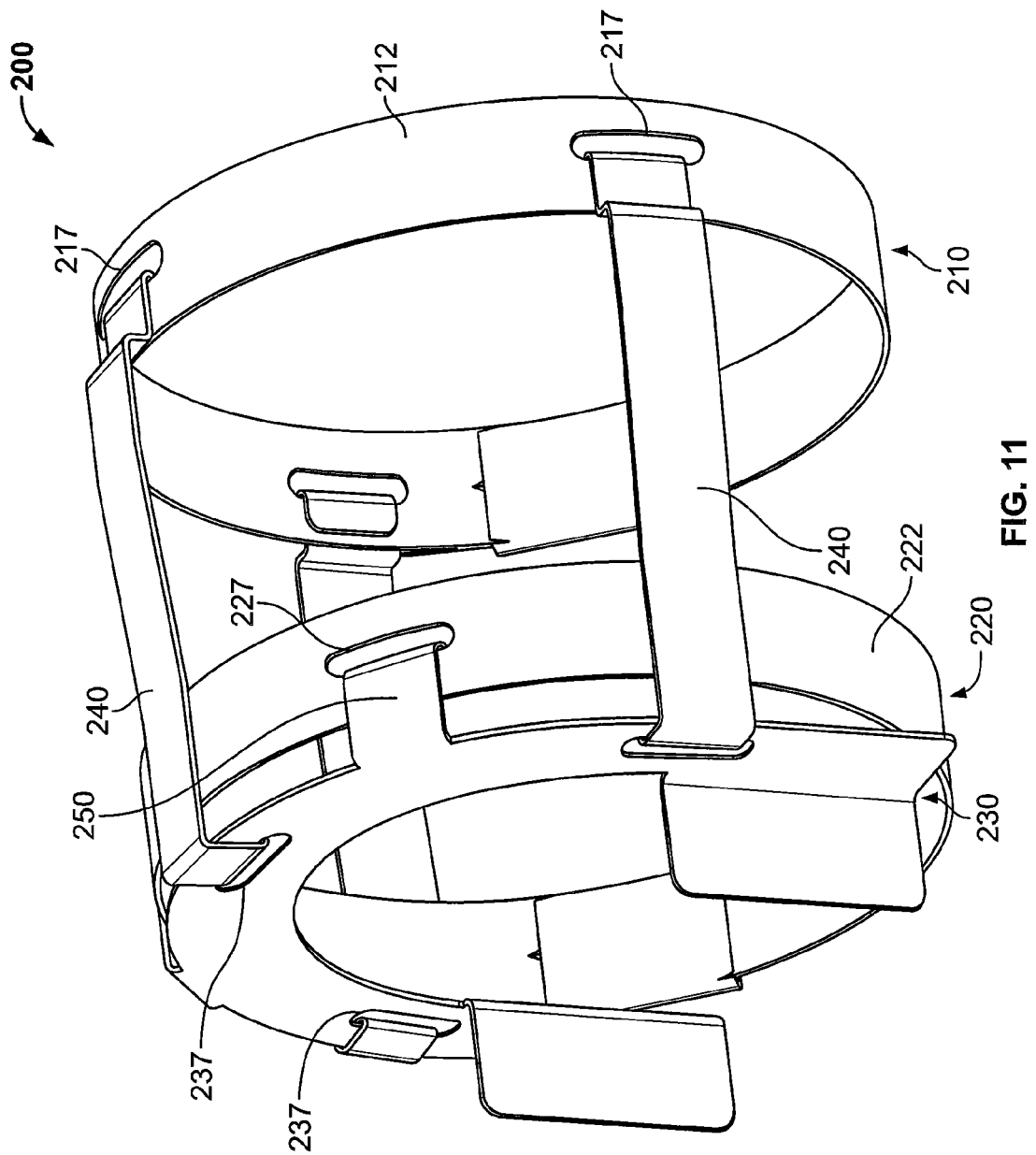
FIG. 11 is a front perspective view of a splice sleeve retainer according to further embodiments of the invention.

With reference to FIG. 11, a splice sleeve retainer 200 according to further embodiments is shown therein. The splice sleeve retainer 200 corresponds to the splice sleeve retainer 100 except in the manner in which the straps 240, 250 are coupled to the circumferential clamps 210, 220. The bands 212, 222 of the clamps 210, 220 and the brace 230 are provided with eyelets or slots 217, 227, 237 through which the bands 240, 250 pass. Portions (e.g., portions 244) of the straps 240, 250 may be folded over to help secure the straps in the eyelets. In further embodiments, the straps 240, 250 may instead or additionally be provided with eyelets through which the bands 212, 222 and/or the brace 230 are secured. In some embodiments, the brace 230 is provided with a circumferentially and axially rearwardly extending flange and eyelets are provided in the flange for attachment of the straps.

Figure 12:
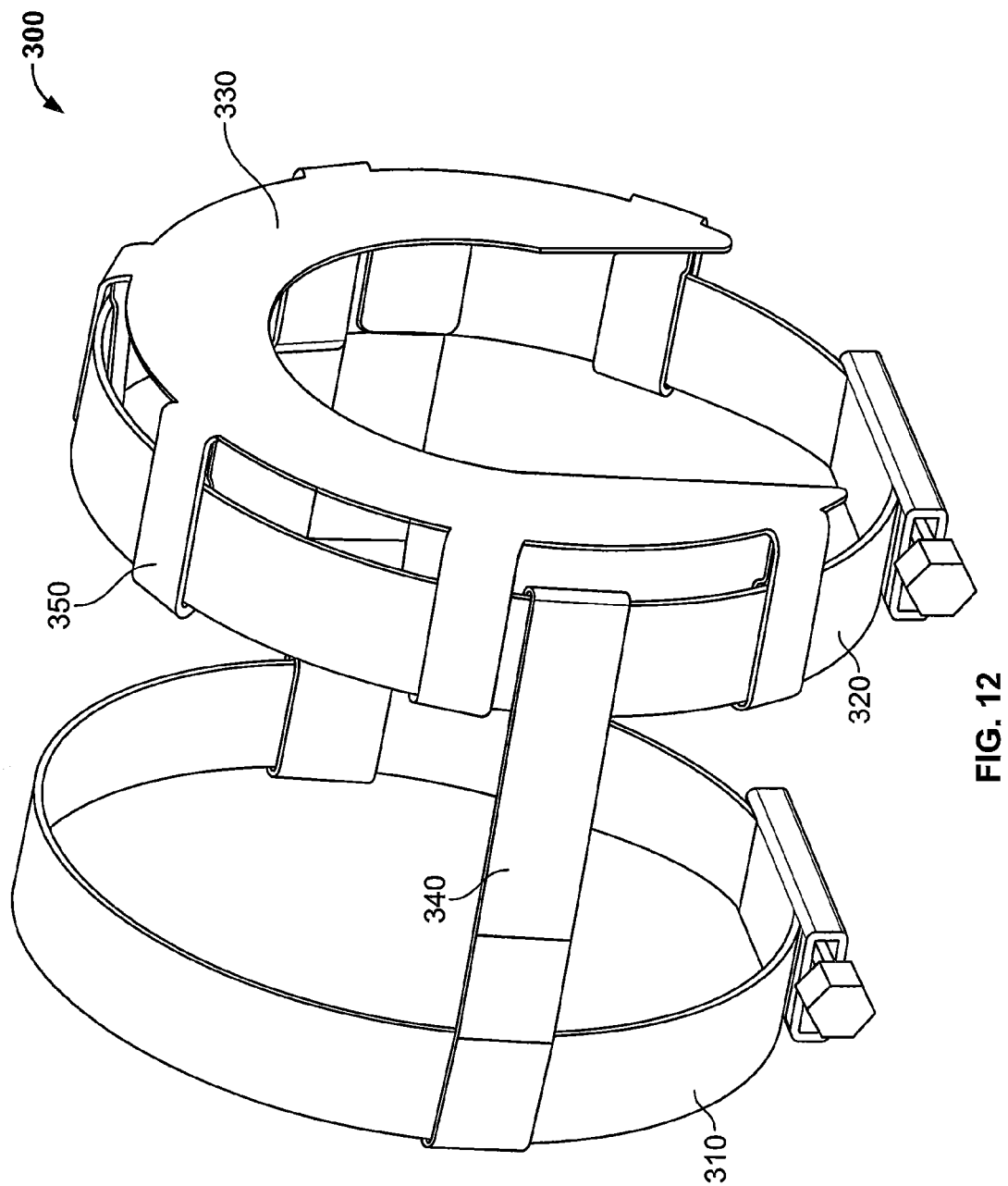
FIG. 12 is a front perspective view of a splice sleeve retainer according to further embodiments of the invention.

FIG. 12 shows a splice sleeve retainer 300 according to further embodiments. In the splice sleeve retainer 300, the straps 340 (and thereby the clamp 310) are secured to the clamp 320, which is in turn secured to the brace 330 by the straps 350.

While the clamps 110, 120 and the brace 130 have been shown and described herein secured to the straps 140, 150 by various techniques (welding, folds, unitary or monolithic formation or merger, adhesive, or eyelets), other techniques may be used.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A splice sleeve retainer for securing a sleeve to a leg of an electrical joint body, the electrical joint body including a flange the splice sleeve retainer having a retention axis and comprising:
    at least one connecting strap extending along the retention axis; and
    first, second and third coupling members secured to the at least one connecting strap at axially spaced apart locations along the at least one connecting strap;
    wherein the splice sleeve retainer is configured such that, when the sleeve is installed on the leg and the splice sleeve retainer is installed on the sleeve:
        the first coupling member engages the sleeve at a first axial location;
        the second coupling member engages the sleeve at a second axial location axially between the first axial location and the flange; and
        the third coupling member engages the electrical joint body to resist axial displacement of the sleeve relative to the leg.

2. The splice sleeve retainer of claim 1 wherein the second coupling member includes a circumferential clamp configured to radially compress and environmentally seal the sleeve.

3. The splice sleeve retainer of claim 2 wherein the second coupling member is configured or configurable to form an endless clamp loop and includes an adjustment mechanism operable to selective reduce an inner diameter of the clamp loop to radially compress the sleeve.

4. The splice sleeve retainer of claim 3 wherein the second coupling member includes a hose clamp.

5. The splice sleeve retainer of claim 2 wherein the second coupling member is configured or configurable in an open position to laterally receive the sleeve, and can thereafter be configured to form the endless clamp loop surrounding the sleeve.

6. The splice sleeve retainer of claim 2 wherein the first coupling member includes a circumferential clamp configured to radially compress the sleeve at the first axial location.

7. The splice sleeve retainer of claim 1 wherein the third coupling member includes a generally U-shaped brace having a laterally facing side opening.

8. The splice sleeve retainer of claim 7 wherein the brace is configured to engage the flange on the electrical joint body.

9. The splice sleeve retainer of claim 7 including an integral stabilizing feature configured to stiffen the brace.

10. The splice sleeve retainer of claim 1 wherein the at least one connecting strap includes a plurality of connecting straps.

11. The splice sleeve retainer of claim 10 wherein the plurality of connecting straps includes:
    a first connecting strap secured to both the second coupling member and the third coupling member but not the first coupling member; and
    a second connecting strap secured to the first coupling member and at least one of the second coupling member and the third coupling member.

12. The splice sleeve retainer of claim 1 wherein the at least one connecting strap includes a connecting strap secured to both the first coupling member and the third coupling member.

13. The splice sleeve retainer of claim 12 wherein the at least one connecting strap includes a connecting strap secured to each of the first, second and third coupling members.

14. The splice sleeve retainer of claim 1 wherein the second coupling member is located proximate the third coupling member and closer to the third coupling member than to the first coupling member.

15. An environmentally protected joint assembly comprising:
    an electrical joint body including a leg and a flange;
    an electrically insulating sleeve mounted on the leg; and
    a splice sleeve retainer including:
        at least one connecting strap extending along a retention axis; and
        first and second coupling members secured to the at least one connecting strap at axially spaced apart locations along the at least one connecting strap;
    wherein the splice sleeve retainer is mounted on the sleeve and the electrical joint body such that:
        the first coupling member engages the sleeve at a first axial location; and
        the second coupling member engages the sleeve at a second axial location axially between the first axial location and the flange.

16. The joint assembly of claim 15 wherein the second coupling member is clamped onto the sleeve.

17. The joint assembly of claim 15 wherein:
    the splice sleeve retainer includes a third coupling member secured to the at least one connecting axis at a location axially spaced apart from the first coupling member; and
    the third coupling member engages the electrical joint body to resist axial displacement of the sleeve relative to the leg.

18. The joint assembly of claim 17 wherein the third coupling member includes a generally U-shaped brace portion engaging the flange and having a laterally facing side opening.

19. The joint assembly of claim 15 wherein:

the sleeve is elastomeric; and the second coupling member includes a circumferential clamp that radially compresses and environmentally seals the sleeve.

20. The joint assembly of claim 19 wherein the first coupling member includes a circumferential clamp that radially compresses the sleeve at the first axial location.

21. The joint assembly of claim 15 wherein the at least one connecting strap includes a plurality of connecting straps connecting the first and second securing members.

* * * * *